(12) United States Patent
Suzuki

(10) Patent No.: US 11,856,161 B2
(45) Date of Patent: *Dec. 26, 2023

(54) IMAGE FORMING APPARATUS STORES CONTACT HISTORY INFORMATION OF PERSON CONTACTED VIRUS, AND FURTHER DISPLAYS INFORMATION OF SURVIVAL OF THE VIRUS CONTACTED BY THE PERSON AT A SITE OF THE IMAGE FORMING APPARATUS

(71) Applicant: TOSHIBA TEC KABUSHIKI KAISHA, Tokyo (JP)

(72) Inventor: Katsunori Suzuki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 17/947,210

(22) Filed: Sep. 19, 2022

(65) Prior Publication Data

US 2023/0061696 A1    Mar. 2, 2023

Related U.S. Application Data

(63) Continuation of application No. 17/412,420, filed on Aug. 26, 2021, now Pat. No. 11,483,439.

(51) Int. Cl.
H04N 1/00 (2006.01)
G03G 21/00 (2006.01)
(Continued)

(52) U.S. Cl.
CPC ....... H04N 1/00405 (2013.01); H04N 1/0097 (2013.01); H04N 1/00323 (2013.01);
(Continued)

(58) Field of Classification Search
None
See application file for complete search history.

(56) References Cited

U.S. PATENT DOCUMENTS 8,259,085 B2     9/2012  Kobayashi
10,482,753 B2*  11/2019  Nelson ................... G16H 40/67
(Continued)

FOREIGN PATENT DOCUMENTS

JP    2018-84975    5/2018
JP    2020-014086   1/2020

OTHER PUBLICATIONS

Machine Translation in English of JP Pub 2020/014086 to Hashimoto et al.*

(Continued)

*Primary Examiner* — Haris Sabah
(74) *Attorney, Agent, or Firm* — AMIN, TUROCY & WATSON, LLP

(57) ABSTRACT

According to one embodiment, an image forming apparatus includes a printer, a memory, a processor, and a display. The printer forms an image according to the operation of a person. The memory stores contact history information indicating the history of contact of a person. The processor acquires information on contact infection of a virus at a site contacted by a specific person from the contact history information stored in the memory. The display shows information on the contact infection of the virus.

20 Claims, 8 Drawing Sheets

(51) Int. Cl.
  *G03G 21/10* (2006.01)
  *G03G 15/20* (2006.01)
  *G03G 15/00* (2006.01)
  *G03G 21/16* (2006.01)

(52) U.S. Cl.
  CPC ..... *H04N 1/00392* (2013.01); *G03G 15/2025* (2013.01); *G03G 15/55* (2013.01); *G03G 21/00* (2013.01); *G03G 21/0064* (2013.01); *G03G 21/10* (2013.01); *G03G 21/169* (2013.01); *H04N 2201/0094* (2013.01)

(56) References Cited

U.S. PATENT DOCUMENTS

| | | |
|---|---|---|
| 10,986,136 B1 | 4/2021 | Natarajan et al. |
| 2009/0013441 A1 | 1/2009 | Duffy |
| 2009/0073128 A1 | 3/2009 | Marsden |
| 2010/0003444 A1* | 1/2010 | Tsukuda ............... G11B 7/26 118/313 |
| 2010/0033444 A1 | 2/2010 | Kobayashi |
| 2019/0104747 A1* | 4/2019 | Robertson ............ A22C 17/08 |
| 2020/0034555 A1 | 1/2020 | Ohno et al. |

OTHER PUBLICATIONS

Non-Final Office Action for U.S. Appl. No. 17/412,420 dated Mar. 24, 2022.

\* cited by examiner

| TEMPERATURE AND HUMIDITY | VERY WET | WET | DRY | VERY DRY |
|---|---|---|---|---|
| ELAPSED TIME | LIKELIHOOD OF SURVIVAL OF VIRUS | LIKELIHOOD OF SURVIVAL OF VIRUS | LIKELIHOOD OF SURVIVAL OF VIRUS | LIKELIHOOD OF SURVIVAL OF VIRUS |
| 0 | 100 | 100 | 100 | 100 |
| 24 | 70 | 70 | 70 | 70 |
| 48 | 30 | 30 | 30 | 30 |
| 72 | 0 | 0 | 10 | 20 |
| 96 | 0 | 0 | 0 | 10 |
| 120 | 0 | 0 | 0 | 0 |

FIG. 7

| ANTI-VIRUS FILM |||||
|---|---|---|---|---|
| TEMPERATURE AND HUMIDITY | VERY WET | WET | DRY | VERY DRY |
| ELAPSED TIME | LIKELIHOOD OF SURVIVAL OF VIRUS | LIKELIHOOD OF SURVIVAL OF VIRUS | LIKELIHOOD OF SURVIVAL OF VIRUS | LIKELIHOOD OF SURVIVAL OF VIRUS |
| 0 | 100 | 100 | 100 | 100 |
| 24 | 50 | 50 | 60 | 60 |
| 48 | 0 | 0 | 10 | 20 |
| 72 | 0 | 0 | 0 | 10 |
| 96 | 0 | 0 | 0 | 0 |
| 120 | 0 | 0 | 0 | 0 |

| | ELAPSED TIME FROM LAST CONTACT | LIKELIHOOD OF SURVIVAL OF VIRUS |
|---|---|---|
| TOUCH PANEL | 15 HOURS | 90% |
| OPERATION BUTTON | 72 HOURS OR MORE | 0% |
| ADF | 72 HOURS OR MORE | 0% |
| PAPER FEED CASSETTE | 72 HOURS OR MORE | 0% |

SUPPRESSION OF VIRUS CONTACT INFECTION

CLEANING

INFECTION STATUS
DOMESTIC: XXXX PERSONS
REGIONAL: XXX PERSONS

IMAGE FORMING APPARATUS STORES CONTACT HISTORY INFORMATION OF PERSON CONTACTED VIRUS, AND FURTHER DISPLAYS INFORMATION OF SURVIVAL OF THE VIRUS CONTACTED BY THE PERSON AT A SITE OF THE IMAGE FORMING APPARATUS

CROSS-REFERENCE TO RELATED APPLICATION

This application is a Continuation of application Ser. No. 17/412,420 filed on Aug. 26, 2021, the entire contents of which are incorporated herein by reference.

FIELD

Embodiments described herein relate generally to an image forming apparatus and associated methods.

BACKGROUND

In recent years, viruses such as the new coronavirus or influenza virus may be infected by contact. An apparatus used by a plurality of people has a possibility of contact infection if another person touches a part of the apparatus that a virus-infected person has contacted for operation or the like. An image forming apparatus such as a digital multifunction apparatus is an apparatus shared by a plurality of people.

In general, it is known that the viruses attached to an object decrease with the lapse of time and die out after a lapse of a predetermined time. A virus that dies after 3 days on plastic is at risk of contact infection on a plastic touch panel from the time an infected person touches the virus until 3 days have passed. For example, if the survival of the virus can be confirmed, a user can use the image forming apparatus by taking measures against contact infection according to the situation. However, the image forming apparatus of the related art cannot notify the user of a risk of viral infection such as contact infection.

DESCRIPTION OF THE DRAWINGS

FIG. 7 is a view illustrating an example of tabular data illustrating the relationship between elapsed time and the likelihood of survival of the virus at four humidity levels if the antibacterial film is applied;

DETAILED DESCRIPTION

In general, according to one embodiment, an image forming apparatus includes a printer, a memory, a processor, and a display. The printer forms an image according to the operation of a person. The memory stores contact history information indicating the history of contact of a person. The processor acquires information on contact infection of a virus at a site contacted by a specific person from the contact history information stored in the memory. The display shows information on the contact infection of the virus. According to another embodiment, a method for an image forming apparatus, involves forming an image according to an operation of a person; storing contact history information indicating history of contact of the person; acquiring information on contact infection of a virus at a site contacted by a specific person from the contact history information stored; and displaying the information on contact infection of the virus.

Hereinafter, the present embodiment will be described with reference to drawings.

First, the configuration of a digital multifunction apparatus (MFP, Multi-Functional Peripheral) 1 as the image forming apparatus according to the embodiment will be described.

Figure 1:
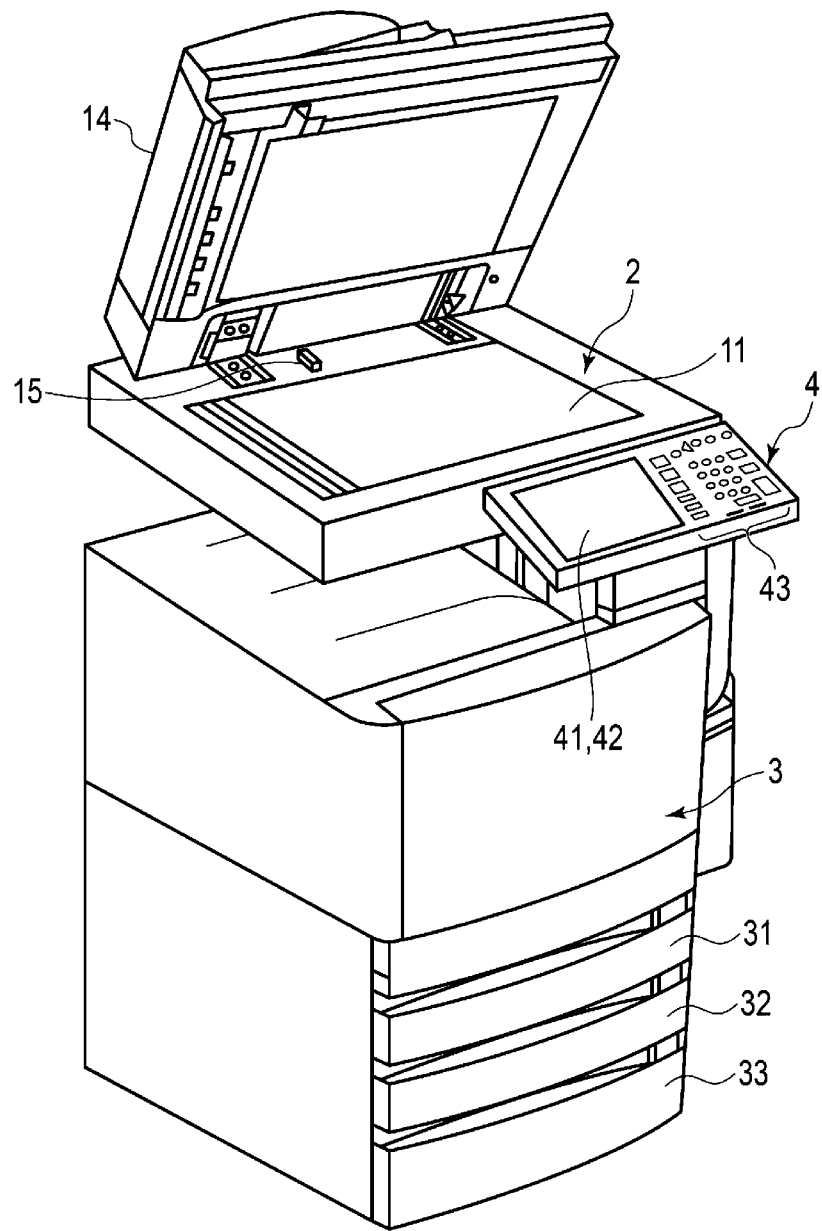
FIG. 1 is a perspective view illustrating an example of an external configuration of a digital multifunction apparatus as an image forming apparatus according to an embodiment.

FIG. 1 is a perspective view illustrating an example of an external configuration of the digital multifunction apparatus 1 as the image forming apparatus according to the embodiment.

As illustrated in FIG. 1, the digital multifunction apparatus 1 includes a scanner 2, a printer 3, and an operation panel 4.

The scanner 2 is installed on the upper part of the main body of the digital multifunction apparatus. The scanner 2 is a device that optically reads an image of an original. The scanner 2 includes an original table glass 11, an automatic original feeder (ADF) 14, and a sensor 15.

The scanner 2 reads the image of the original set on the original table glass 11 or the image of the original conveyed by the ADF 14.

The scanner 2 reads the image of the original on the original table glass 11 through the glass of the original table glass 11 by an image reading mechanism.

The ADF 14 includes a paper feed tray, a conveyance system, and the like. The paper feed tray of the ADF 14 holds the original to be read. The conveyance system of the ADF 14 takes out the originals set in the paper feed tray one by one, and conveys the originals so that the reading surface of the taken out originals passes through a predetermined reading position.

The ADF 14 is installed so as to be opened and closed. The ADF 14 also functions as an original table cover. With the ADF 14 closed, the ADF 14 covers the entire original reading area on the original table glass 11. The sensor 15 detects the open and closed state of the ADF 14.

The printer 3 forms an image on paper. The printer 3 includes paper feed cassettes 31, 32, and 33. These paper feed cassettes 31, 32, and 33 store paper as an image-forming medium on which an image is printed. For example, each of the paper feed cassettes 31, 32, and 33 can be attached to and detached from the lower part of the main body of the digital multifunction apparatus. The printer 3 includes a cassette sensor 74 (see FIG. 2) that detects the attachment or detachment of each of the paper feed cassettes 31, 32, and 33.

The printer 3 has a pick-up mechanism for picking up paper one by one from any of the paper feed cassettes 31, 32, and 33. The printer 3 includes a conveyance system 72 and an image forming unit 73. The conveyance system 72 conveys the paper in the printer 3. The conveyance system 72 conveys the paper picked up by the pick-up mechanism to an image transfer position at the timing when the image formed by the image forming unit 73 is transferred.

The image forming unit 73 may use any image forming method. For example, in the case of an electrophotographic method, the image forming unit 73 forms a developer image on an image carrier such as a photoconductive drum. The image forming unit 73 transfers the developer image on the image carrier to the paper conveyed by the conveyance system 72. Further, in the case of an inkjet method, the image forming unit 73 forms an image on the paper conveyed by the conveyance system 72 by the ink ejected by an inkjet head.

The operation panel 4 is a user interface. The operation panel 4 includes a display unit (display) 41, a touch panel 42, and a plurality of operation buttons 43. The display unit 41 displays operation guidance and the like. The touch panel 42 is provided on the display screen of the display unit 41. The touch panel 42 detects a site touched by the user on the display screen of the display unit 41.

Next, the configuration of a control system in the digital multifunction apparatus configured as described above will be described.

Figure 2:
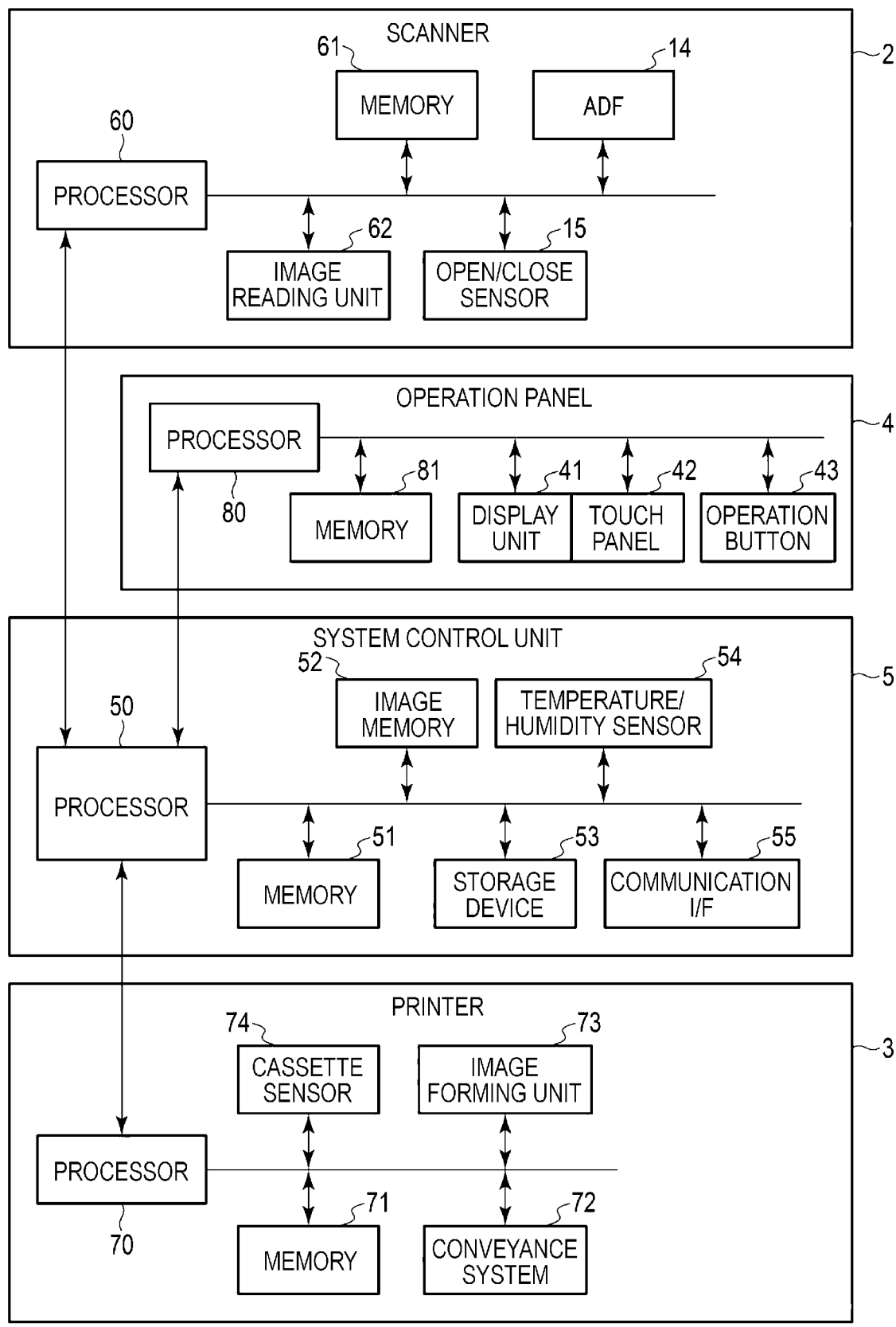
FIG. 2 is a block view illustrating a configuration example of a control system in the digital multifunction apparatus.

FIG. 2 is a block view illustrating a configuration example of the control system in the digital multifunction apparatus 1 according to the embodiment.

The digital multifunction apparatus 1 includes a system control unit 5 that controls the entire apparatus. The system control unit 5 connects to the scanner 2, the printer 3, and the operation panel 4. In the configuration example illustrated in FIG. 2, the system control unit 5 includes a processor 50, a memory 51, an image memory 52, a storage device 53, a temperature and humidity sensor 54, a communication interface (I/F) 55, and the like.

The processor 50 connects to a processor 60 of the scanner 2, a processor 70 of the printer 3, and a processor 80 of the operation panel 4 via an interface. The processor 50 realizes various processing functions by executing a program stored in the memory 51 or the storage device 53. For example, the processor 50 outputs an operation instruction to each part or processes various information from each part by executing the program stored in the memory 51.

The memory 51 includes memories such as random access memory (RAM), read-only memory (ROM), and NVM. The RAM functions as working memory or buffer memory. The ROM is a non-volatile memory that cannot be rewritten. The ROM functions as a program memory. The NVM is a rewritable non-volatile memory. The NVM stores setting data and the like.

The image memory 52 stores image data. For example, the image memory 52 functions as a page memory for expanding the image data to be processed. The storage device 53 stores data such as control data, a control program, and setting information. The storage device 53 is composed of a rewritable non-volatile memory. For example, the storage device 53 is composed of a storage device such as a hard disk drive (HDD) or a solid state drive (SSD).

The temperature and humidity sensor 54 detects temperature and humidity. The temperature and humidity sensor 54 is an example of a sensor for detecting environmental information used for calculating the likelihood of survival of a virus. The temperature and humidity sensor 54 is installed so as to detect the temperature and humidity around the digital multifunction apparatus 1. Further, the temperature and humidity sensor 54 may detect the temperature and humidity in the digital multifunction apparatus 1. For example, the temperature and humidity sensor 54 may be provided in the printer 3. Further, the temperature and humidity sensor 54 may be provided on the scanner 2 or the operation panel 4.

The communication I/F 55 is an interface for performing data communication with an external apparatus. For example, the communication I/F 55 functions as an image acquisition unit that acquires an image to be printed on paper from an external apparatus such as a PC. The communication I/F 55 also functions as an interface for communicating with a server described later.

Next, a configuration example of the control system in the scanner 2 will be described.

As illustrated in FIG. 2, the scanner 2 includes the processor 60, a memory 61, an image reading unit (image reading mechanism) 62, the ADF 14, the open and close sensor 15, and the like.

The processor 60 realizes various processing by executing the program stored in the memory 61. For example, the processor 60 controls the operation of each part in the scanner 2 and monitors the operation status of each part by executing the program. Further, the processor 60 is connected to the processor 50 of the system control unit 5 via the interface. The processor 60 executes scan processing in response to an operation instruction from the system control unit 5.

The memory 61 includes a memory such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The ADF 14 includes a pickup roller for taking in an original, a conveyance system for conveying the original, and the like. The processor 60 drives the pickup roller and the conveyance system to convey the originals one by one to the reading position.

The image reading unit 62 reads an image of the original set on the original table glass 11. Further, the image reading unit 62 reads an image of the original conveyed by the ADF 14. The image reading unit 62 includes an illumination, an optical system, a photoelectric conversion unit, and the like. The illumination irradiates the original surface with light. The optical system guides the reflected light from the original surface to the photoelectric conversion unit. The photoelectric conversion unit converts the light from the original surface into an electric signal.

The open and close sensor 15 detects the open and closed status of the ADF 14. The open and close sensor 15 is an example of a sensor for detecting that a user has touched the ADF 14. For example, the processor 50 of the system control unit 5 determines that a user has touched the ADF 14 if the open and close sensor 15 detects the open and close operation of the ADF 14.

Next, a configuration example of the control system in the printer 3 will be described.

As illustrated in FIG. 2, the printer 3 includes the processor 70, a memory 71, the conveyance system 72, the image forming unit 73, the cassette sensor 74, and the like.

The processor 70 realizes various processing by executing the program stored in the memory 71. For example, the processor 70 controls the operation of each part in the printer 3 and monitors the operation status of each part by executing the program. Further, the processor 70 is connected to the processor 50 of the system control unit 5 via the interface. The processor 70 executes print processing or the like in response to an operation instruction from the system control unit 5.

The memory 71 includes a memory such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The conveyance system 72 conveys paper in the printer 3 under the control of the processor 70. The conveyance system 72 includes a pickup roller that takes in the paper in the paper feed cassettes 31, 32, and 33 one by one, a conveyance roller that conveys the paper, and the like. For example, the conveyance system 72 conveys paper by driving the conveyance rollers of each part in response to an operation instruction from the processor 70.

The image forming unit 73 forms an image. For example, the electrophotographic image forming unit 73 includes an exposure device, a photoconductive drum, a developing device, an intermediate transfer body, a transfer unit, a fixing device, and the like. The exposure device forms an electrostatic latent image on the photoconductive drum in response to an operation instruction from the processor 70. The developing device develops the electrostatic latent image on the photoconductive drum with toner of each color. Further, the developed image on the photoconductive drum is transferred to the intermediate transfer body. The transfer unit transfers (secondary transfer) the developer image transferred to the intermediate transfer body to paper in response to an operation instruction from the processor 70. The fixing device drives a heat roller and a pressurizing roller in response to an operation instruction from the processor 70. The fixing device heats the paper on which the developer image is transferred under pressure. As a result, the developer image is fixed on the paper.

The cassette sensor 74 detects the attachment and detachment of each of the paper feed cassettes 31, 32, and 33. The cassette sensor 74 is an example of a sensor for detecting that a user has touched the paper feed cassettes 31, 32, and 33. For example, when replenishing the paper feed cassette 31 with paper, the cassette sensor 74 detects that the paper feed cassette 31 has been pulled out by a user. Further, if the paper feed cassette 31 replenished with paper is installed, the cassette sensor 74 detects the installation of the paper feed cassette. The processor 50 of the system control unit determines that a user has touched the cassettes 31, 32, and 33 if the cassette sensor 74 detects the attachment and detachment of the paper feed cassettes 31, 32, and 33.

Next, a configuration example of the control system on the operation panel 4 will be described.

As illustrated in FIG. 2, the operation panel 4 includes the processor 80, a memory 81, the display unit (display) 41, the touch panel 42, the operation buttons 43, and the like.

The processor 80 realizes various processing by executing the program stored in the memory 81. For example, the processor 80 controls the operation of each part of the operation panel 4 and monitors the operation status of each part by executing the program. Further, the processor 80 is connected to the processor 50 of the system control unit 5 via the interface. For example, the processor 80 notifies the system control unit 5 of the information input by a user.

The memory 81 includes memories such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The display content of the display unit 41 is controlled in response to an operation instruction from the processor 80. The touch panel 42 is provided on the display screen of the display unit 41, and detects a touch position on the display screen. For example, the processor 80 displays an icon that can be selected on the touch panel 42 on the display screen of the display unit 41 together with the operation guidance. The processor 80 determines the information input by a user according to the touch position detected by the touch panel 42. The operation button 43 is composed of hard keys such as a start key and a reset key.

In addition to the open and close sensor 15 and the cassette sensor 74, the digital multifunction apparatus 1 may be provided with a sensor that detects that a part such as a cover of each part is operated (for example, opened or closed) by a user. In this case, the processor 50 of the system control unit 5 may be configured to determine that a user has touched the site where the sensor has detected an operation.

Next, processing of the digital multifunction apparatus 1 as the image forming apparatus according to the embodiment providing information on a virus to a user will be described.

The processor 50 of the system control unit 5 provides information on a virus to a user who uses the digital multifunction apparatus 1 by executing various programs. For example, the processor 50 provides information indicating the likelihood of survival of a virus in the digital multifunction apparatus 1 as information on the virus to be provided to the user.

The likelihood of survival of a virus is set as a value that predicts the likelihood that the virus will remain at the site contacted by a virus-infected person. The processor 50 assumes that a user who comes into contact with the digital multifunction apparatus is an infected person, and calculates (predicts) the likelihood of survival of a virus according to the elapsed time from the contact of the user with the digital multifunction apparatus. The processor 50 performs processing of displaying information such as the calculated information indicating the likelihood of survival of the virus on the display 41.

In order to provide information indicating the likelihood of survival of the virus, the processor 50 stores a log indicating the contact of a person with the digital multifunction apparatus 1 as contact history information. The processor 50 detects the contact of a person and executes a program that stores the contact history information in the memory 51 or the storage device 53. The program for storing the contact history information is installed in the memory 51 or the storage device 53.

The contact history information is information including information indicating a site contacted by the user and the time of contact. For example, the processor 50 identifies that a person has touched the touch panel 42 based on the information indicating the input contents to the touch panel 42 of the operation panel 4. Further, the processor 50 identifies that a person has touched the operation button 43 of the operation panel 4 based on the signal indicating the input to the operation button 43. The contact with the paper feed cassettes 31, 32, and 33 is identified from the detection result by the cassette sensor 74. Further, the contact with the ADF 14 as the original cover is identified from the detection result of the open and close sensor 15.

The processor 50 calculates the likelihood of survival of a virus at each site in contact with a user based on the data indicating the likelihood of survival of the virus with respect to elapsed time and the contact history information. For example, a program that calculates the likelihood of survival of a virus is installed in the memory 51 or the storage device 53. The processor 50 calculates the likelihood of survival of a virus at the site contacted by a user from the contact history information by executing the program stored in the memory 51.

The likelihood of survival of a virus is calculated based on basic virus information indicating the likelihood of survival of the virus with respect to elapsed time. The elapsed time is identified from the contact history information. The basic virus information is set according to a material (material of the contacted site), temperature, humidity, type of virus, and the like. The basic virus information is stored in the storage device 53 or the memory 51. The basic virus information may be data for which a value has been set by the user, or may be data selected from several profiles.

Further, the basic virus information may be created by a search robot, AI, or the like with reference to general information collected on the Web or the like. In addition, the basic virus information may be set according to the policy presented by a country, a region (local government, and the like), a company, or an organization. Further, the basic virus information may be set according to the policy presented by an expert on contact infection of a virus.

Further, the processor 50 may not only calculate the likelihood of survival of a virus but also calculate the cumulative number of contacts (touches) with a specific site (for example, a touch panel). Further, the processor 50 may correct the calculated value (estimated value) of the likelihood of survival of a virus according to the cleaning for the specific site. The processor 50 may clear the number of contacts with the specific site according to the cleaning for the site.

Further, the processor 50 may display guidance indicating that cleaning is already performed on the display 41 for a predetermined period after the cleaning is performed. Further, the processor 50 may display information indicating the spread status of a virus such as the number of infected persons according to the domestic and regional status, or type of virus on the display 41.

Next, the basic virus information used by the digital multifunction apparatus 1 to calculate the likelihood of survival of a virus will be described.

Figure 3:
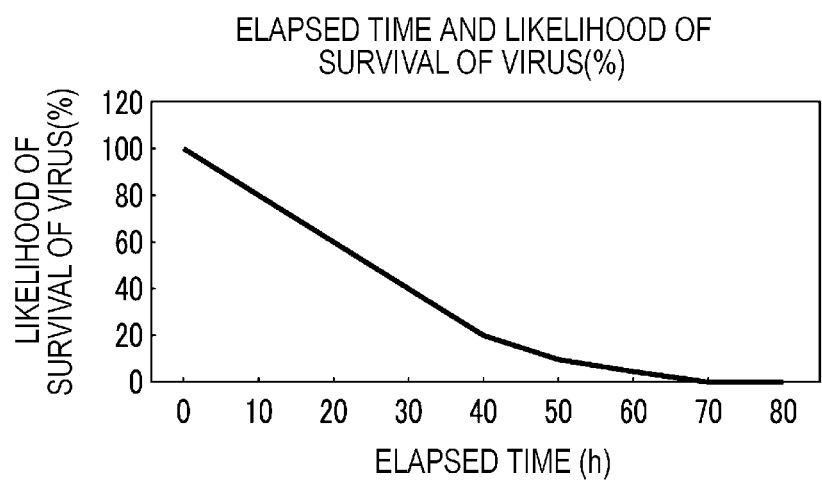
FIG. 3 is a view illustrating an example of a relationship between elapsed time since a virus attached to a site contacted by a user and likelihood of survival of the virus in the digital multifunction apparatus.

FIG. 3 is a view illustrating an example of a relationship between elapsed time since a virus attached to the site contacted by a user such as the touch panel 42 in the digital multifunction apparatus 1 and the likelihood of survival of the virus.

It is assumed that the viruses attached to a certain site decrease with the lapse of time and die out after a lapse of a predetermined time. In the example illustrated in FIG. 3, it is illustrated that the viruses attached to a certain site decrease with the lapse of time and die out in about 72 hours (3 days). According to the relationship illustrated in FIG. 3, the likelihood of survival of a virus can be set to 0 in 72 hours after the last contact.

The information illustrating the relationship between elapsed time and the likelihood of survival of a virus as illustrated in FIG. 3 is used as the basic virus information. The processor 50 identifies the time when a user last contacted the digital multifunction apparatus 1 from the contact history information, and identifies the elapsed time from the contact of the user with the digital multifunction apparatus 1. The processor 50 calculates the likelihood of survival of a virus corresponding to the elapsed time identified from the contact history information.

The basic virus information indicating the relationship between elapsed time and the likelihood of survival of a virus is stored in the memory (memory 51 or storage device 53) in the digital multifunction apparatus 1. For example, the basic virus information may be the data of the function illustrated in the graph illustrated in FIG. 3. In this case, the processor 50 calculates the likelihood of survival of a virus from the elapsed time by the function illustrated in the graph illustrated in FIG. 3. Further, the basic virus information may be data (for example, tabular data) indicating the likelihood of survival of a virus for each elapsed time (for example, time zone) set based on the graph illustrated in FIG. 3. In this case, the processor 50 calculates the likelihood of survival of a virus based on the data indicating the likelihood of survival of the virus for each elapsed time.

The basic virus information may be stored in the memory of an external apparatus that the processor 50 can communicate with via the communication interface 55. Further, the processor 50 may acquire not only the basic virus information but also the likelihood of survival of a virus from an external apparatus capable of communicating via the communication interface 55. In this case, the processor 50 may provide the contact history information to the external apparatus and acquire information indicating the likelihood of survival of the virus with respect to the elapsed time calculated from the external apparatus.

As described above, the viruses attached to a certain site decrease with the lapse of time and die out after a lapse of a predetermined time. However, the rate at which the viruses decrease with the lapse of time and the time until the likelihood of survival of the virus becomes 0 (the virus dies out) differs depending on the environment. For example, the relationship between elapsed time and the likelihood of survival of the virus may vary depending on humidity and temperature.

Figure 4:
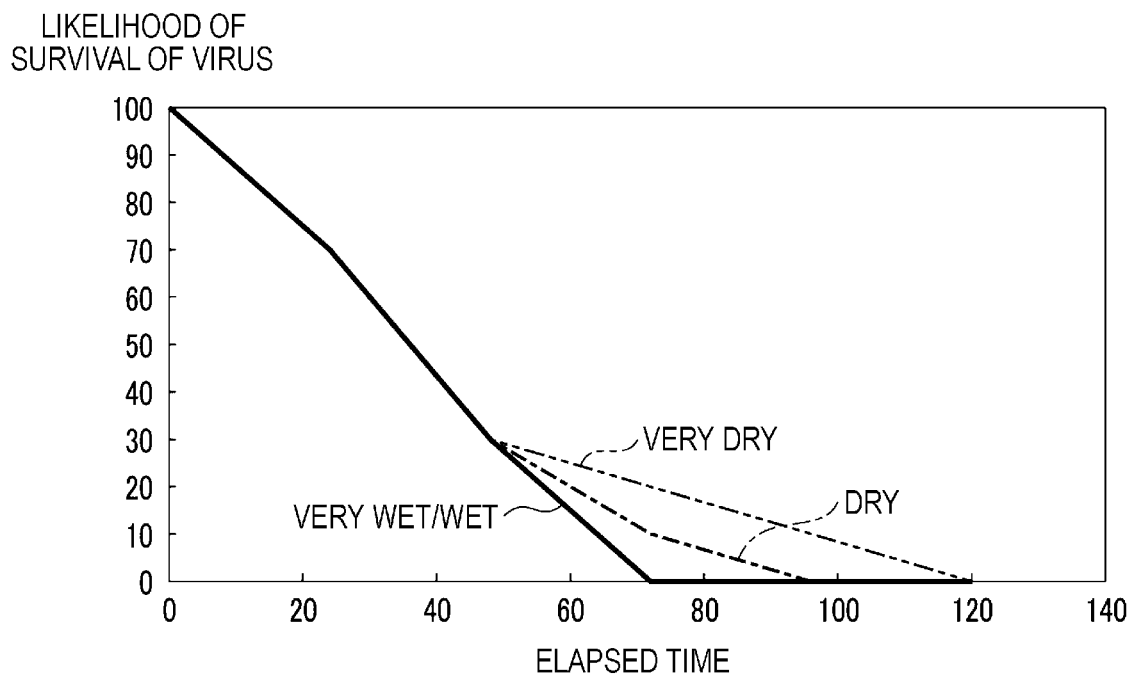
FIG. 4 is a view illustrating an example of a graph illustrating the relationship between elapsed time and the likelihood of survival of the virus at four humidity levels.
Figures 5, 6:
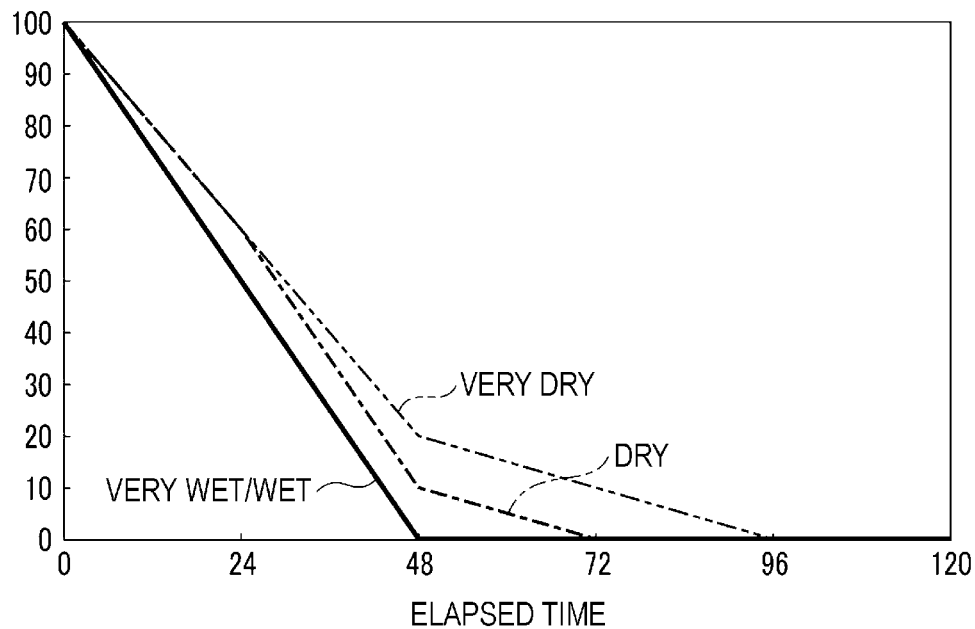
FIG. 5 is a view illustrating an example of tabular data illustrating the relationship between elapsed time and the likelihood of survival of the virus at four humidity levels.
FIG. 6 is a view illustrating an example of a graph illustrating the relationship between elapsed time and the likelihood of survival of the virus at four humidity levels if an antibacterial film is applied.

FIG. 4 is a view illustrating an example of a graph illustrating the relationship between elapsed time and the likelihood of survival of the virus at four humidity levels. FIG. 5 is a view illustrating an example of tabular data illustrating the relationship between elapsed time and the likelihood of survival of the virus at four humidity levels.

As illustrated in FIG. 4, the likelihood of survival of the virus with respect to the elapsed time may vary depending on the environment such as humidity. If the virus has the characteristic of being long-lived in a dry environment, the likelihood of survival of the virus with respect to elapsed time varies, as illustrated in FIG. 4.

For viruses whose likelihood of survival varies with humidity, it is conceivable to set basic virus information for each of a plurality of humidity levels. The digital multifunction apparatus 1 includes the temperature and humidity sensor 54. The processor 50 calculates the likelihood of survival of the virus with respect to elapsed time based on the basic virus information according to the humidity detected by the temperature and humidity sensor.

Basic virus information according to environmental information such as humidity is stored in the memory (memory 51 or storage device 53) in the digital multifunction apparatus 1. For example, the basic virus information according to the environmental information may be the data of a function illustrated in a graph for each humidity level as illustrated in FIG. 4. In this case, the processor 50 selects a function corresponding to the humidity detected by the temperature and humidity sensor 54, and calculates the likelihood of survival of the virus from the elapsed time.

As illustrated in FIG. 5, the basic virus information according to the environmental information such as humidity may be tabular data illustrating the likelihood of survival of the virus with respect to the elapsed time for each environmental information. In this case, the processor 50 calculates the likelihood of survival of the virus corresponding to the humidity detected by the temperature and humidity sensor 54 and the elapsed time based on the tabular data.

The likelihood that a virus attached to a site will survive depends on the material of the site. For example, at the site where the antibacterial film having an antibacterial function is applied, the rate of virus reduction increases with the lapse of time, and the time required for the virus to die out also shortens. In addition, the likelihood of survival of the virus with respect to the elapsed time also varies if the material is changed or the coating treatment is applied to the site in contact with the user.

It is assumed that the digital multifunction apparatus 1 stores the setting information including the information indicating the material in the memory 51 or the storage device 53 for the site in contact with a user. If an antibacterial film is applied to a certain site, the setting information of the site stored in the memory 51 is updated to the information indicating the changed material. In addition, if the material is changed, or if the coating treatment is applied, the information indicating the material included in the setting information of the site is updated.

FIG. 6 is a view illustrating an example of a graph illustrating the relationship between elapsed time at four humidity levels and the likelihood of survival of the virus if the antibacterial film is applied. FIG. 7 is a view illustrating an example of tabular data illustrating the relationship between elapsed time at four humidity levels and the likelihood of survival of the virus if an antibacterial film is applied.

As illustrated in FIGS. 6 and 7, the likelihood of survival of the virus with respect to elapsed time decreases in a short time at the site where the antibacterial film is applied. For example, the graph illustrated in FIG. 6 illustrates that the likelihood of survival of the virus decreases sharply as compared with the graph illustrated in FIG. 4. The graph illustrated in FIG. 6 illustrates that the virus dies out in about 40 hours in a highly humid environment.

For a virus whose likelihood of survival varies depending on the material, it is conceivable to set the basic virus information for each material. The basic virus information for each material is stored in the memory (memory 51 or storage device 53) in the digital multifunction apparatus 1.

For example, the basic virus information for each material may be data represented by a function illustrated in the graph as illustrated in FIG. 6. In this case, the processor 50 identifies the material of the site contacted by the user from the setting information, and calculates the likelihood of survival of the virus from the elapsed time by using a function selected according to the material.

Further, as illustrated in FIG. 7, the basic virus information for each of the various materials may be tabular data illustrating the likelihood of survival of the virus with respect to elapsed time. In this case, the processor 50 calculates the likelihood of survival of the virus corresponding to the material identified from the setting information and the elapsed time identified from the contact history information based on the tabular data.

Next, the operation of the digital multifunction apparatus 1 according to the embodiment will be described.

Figure 8:
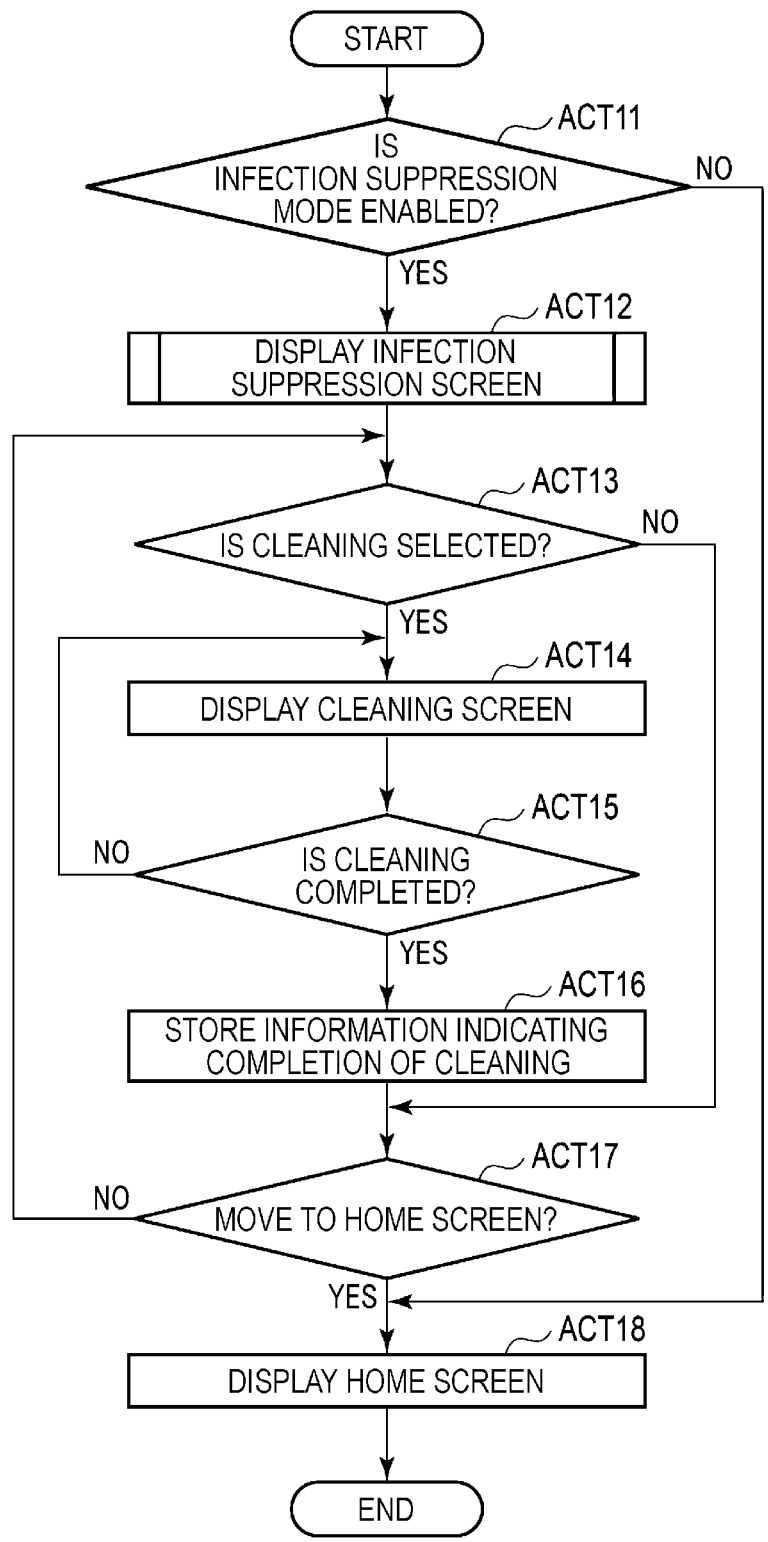
FIG. 8 is a flowchart illustrating an operation of the digital multifunction apparatus providing information on the virus to the user.

FIG. 8 is a flowchart illustrating an operation of the digital multifunction apparatus 1 providing information on a virus to a user.

First, the processor 50 of the system control unit 5 in the digital multifunction apparatus 1 determines whether or not the apparatus is in an infection suppression mode for suppressing the contact infection of a virus (ACT 11). For example, the processor 50 executes the operation as illustrated in FIG. 8 if a user logs on to the digital multifunction apparatus 1 or if the apparatus wakes up from a sleep mode. As a result, the digital multifunction apparatus 1 can provide the user with information on the virus at the timing when the user starts operating the operation panel or the like.

The digital multifunction apparatus 1 has an operation mode (infection suppression mode) for displaying information on a virus for suppressing contact infection on the display 41. For example, the infection suppression mode is specified as either enabled or disabled by a user or an administrator. The processor 50 of the system control unit 5 sets the infection suppression mode to either valid or invalid according to the specification of a user or the administrator.

If the infection suppression mode is invalid (ACT 11, NO), the processor 50 displays a home screen such as a main operation screen (main menu screen) on the display 41 (ACT 18). However, the processor 50 may display information on a virus such as the infection status of the virus on the display 41 on a part of the home screen even if the infection suppression mode is disabled.

If the infection suppression mode is valid (ACT 11, YES), the processor 50 executes display processing of displaying information on a virus on the display 41 (ACT 12). For example, the processor 50 displays on the display 41 a guidance screen (infection suppression screen) for guiding the suppression of contact infection, which includes information indicating the likelihood of survival of a virus at the site last contacted by a user. The processing of displaying the infection suppression screen that provides a user with information on a virus will be described in detail later.

Figures 9, 10:
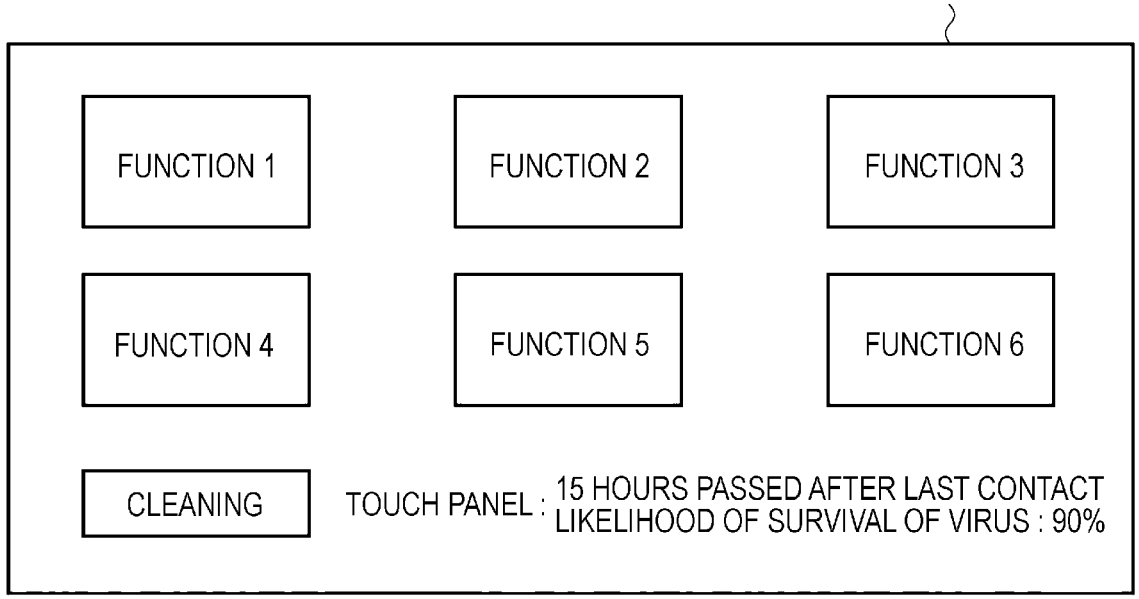
FIG. 9 is a view illustrating a display example of a guidance screen for guiding the suppression of contact infection in a display of the digital multifunction apparatus.
FIG. 10 is a view illustrating a display example of a home screen displayed on the display of the digital multifunction apparatus.

FIG. 9 is a view illustrating a display example of the guidance screen (infection suppression screen) for guiding the suppression of contact infection on the display 41 of the digital multifunction apparatus 1.

In the display example illustrated in FIG. 9, the display 41 displays virus-related information including the elapsed time from the last contact and the likelihood of survival of the virus for each site in contact with a user. The likelihood of survival of the virus is calculated on the assumption that the user who has last contacted is an infected person based on the basic virus information as described above.

Further, in the example illustrated in FIG. 9, the display 41 displays not only the elapsed time and the likelihood of survival of a virus, but also information indicating the infection status and an icon for instructing cleaning. As the information indicating the infection status, information such as the number of newly infected persons of the virus in a country and a region is displayed. Further, as the information indicating the infection status, not only the number of newly infected persons but also the number of severely ill persons, increase rate (decrease rate) of infected persons, bed utilization, and the like may be displayed.

After displaying the infection suppression screen, the processor 50 monitors whether or not cleaning is selected (ACT 13). For example, if the icon for instructing cleaning is instructed on the guidance screen as illustrated in FIG. 9, the processor 50 determines that cleaning has been selected.

If cleaning is not selected (ACT 13, NO), processor 50 determines whether to move to the home screen (ACT 17). For example, if cleaning is not selected, the processor 50 switches the screen displayed on the display 41 to the home screen in response to a predetermined operation by a user. As a specific example, the processor 50 switches the screen displayed on the display 41 to the home screen in response to the user's login. Further, the processor 50 may switch the screen displayed on the display 41 to the home screen if the user touches the touch panel 42 or presses an operation button.

If cleaning is selected (ACT 13, YES), the processor 50 displays a cleaning guidance screen (cleaning screen) on the display 41 with the operation mode as a cleaning mode. For example, on the cleaning screen, the cleaning method and the like are displayed. Further, the processor 50 accepts the completion of cleaning according to a predetermined operation by the user. In this case, the processor 50 determines whether or not the cleaning is completed according to the operation of the user. If the cleaning is completed (ACT 15, YES), the processor 50 stores the log information indicating the completion of the cleaning in the memory 51 or the storage device 53 (ACT 16).

If the cleaning is completed, the processor 50 determines whether or not to move to the home screen (ACT 17). For example, the processor 50 may shift the screen displayed on the display 41 to the home screen if the cleaning is completed. Further, the processor 50 may display the home screen on the display 41 in response to the operation of the user or the like after displaying a guidance screen indicating that the cleaning is completed.

If it is determined that the home screen is to be displayed (ACT 17, YES), the processor 50 displays the home screen on the display 41 (ACT 18). For example, the processor 50 displays a menu screen for instructing the digital multifunction apparatus 1 to perform various operations as the home screen. Further, the processor 50 may display information indicating the infection status in a part of the home screen.

FIG. 10 is a view illustrating a display example of the home screen displayed on the display 41 by the digital multifunction apparatus 1.

On the home screen illustrated in FIG. 10, information on virus infection suppression is displayed along with icons for selecting a function to be executed from a plurality of functions. If the home screen as illustrated in FIG. 10 is displayed, the user can confirm information on virus infection suppression even during operations for instructing various operations.

In addition, an icon for instructing cleaning is also displayed on the home screen illustrated in FIG. 10. Therefore, the user can also instruct cleaning while checking the information on virus infection suppression on the home screen. As a result, the digital multifunction apparatus 1 can not only notify the risk of contact infection, but also encourage the user to perform cleaning to reduce contact infection.

Next, display processing of the digital multifunction apparatus 1 according to the embodiment displaying information on a virus will be described.

Figure 11:
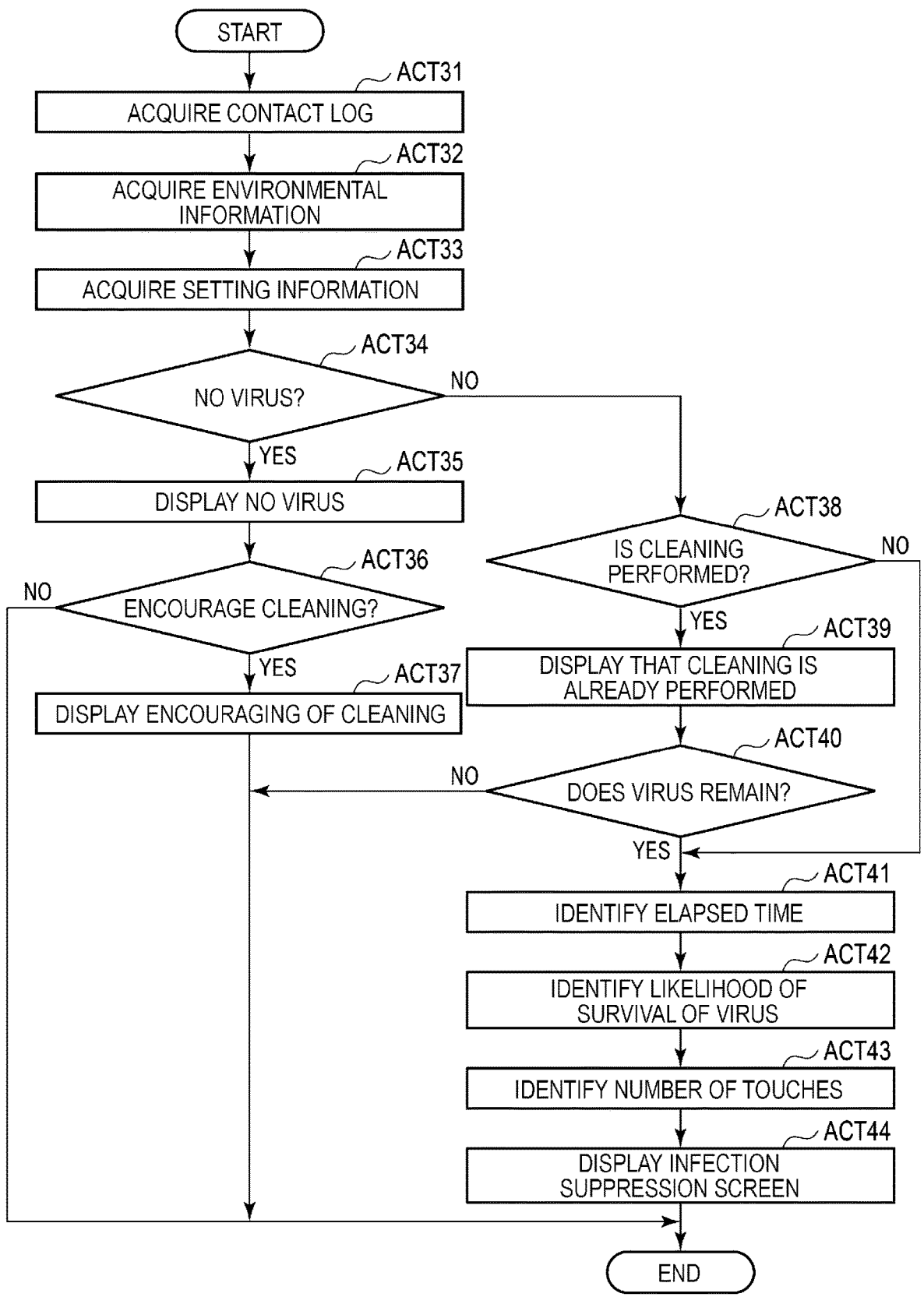
FIG. 11 is a flowchart illustrating display processing of displaying information on the virus on the display in the digital multifunction apparatus.

FIG. 11 is a flowchart illustrating display processing of displaying information on the virus on the display 41 in the digital multifunction apparatus 1 according to the embodiment.

As described above, the processor 50 of the system control unit 5 executes the display processing of displaying the information on the virus on the display 41 in the infection suppression mode. First, the processor 50 acquires contact history information (contact log) (ACT 31). For example, the processor 50 acquires contact history information stored in the memory 51 or the storage device 53 during a predetermined period.

In addition, the processor 50 acquires environmental information used to calculate the likelihood of survival of the virus (ACT 32). For example, when calculating the likelihood of survival of the virus according to the humidity, the processor 50 acquires the humidity information detected by the temperature and humidity sensor 54 as environmental information.

In addition, the processor 50 acquires the setting information used for calculating the likelihood of survival of the virus (ACT 33). For example, when calculating the likelihood of survival of the virus according to the material of each site, the processor 50 identifies the material of each site in contact with a user from the setting information. For example, the processor 50 identifies the site to which the antibacterial film is applied from the setting information.

Upon acquiring the contact history information, the environment information, and the setting information, the processor 50 determines whether or not the virus may remain at the site contacted by the user (ACT 34). For example, the processor 50 determines whether the virus may remain at each site that a user may come into contact with. The processor identifies basic virus information indicating the likelihood of survival of the virus based on the environment information and the setting information.

The processor 50 determines whether or not there is a possibility that the virus remains in each site based on the basic virus information according to the environment information and the setting information. Specifically, the processor 50 determines, for each site, whether or not the elapsed time from the last contact of a user exceeds the time during which the virus can survive. The processor 50 determines that no virus remains at the site where the elapsed time from the last contact of a user exceeds the time during which the virus can survive.

If it is determined that no virus remains at each site (ACT 34, YES), the processor 50 indicates that no virus remains on the display 41 (no risk of contact infection) (ACT 35). For example, the processor 50 displays that the likelihood of survival of the virus is 0 for each site on the guidance screen as illustrated in FIG. 9. Further, the processor 50 may display guidance such as "the digital multifunction apparatus 1 has a low risk of contact infection" on the display 41.

In addition, if it is determined that no virus remains at each site (ACT 34, YES), the processor 50 determines whether or not to encourage cleaning for a specific site (ACT 36). For example, the processor 50 counts the cumulative number of contacts at each site from the contact history information. The processor 50 determines that cleaning is encouraged for a site where the number of contacts by users exceeds a predetermined threshold value. If it is determined that cleaning is encouraged, the processor 50 displays guidance encouraging the cleaning of the specific site on the display 41 (ACT 37). The processor 50 may store information indicating that cleaning is already performed as contact history information in the memory 51 or the storage device 53 if cleaning is performed. Further, the processor 50 may clear the contact history information for the cleaned site if cleaning is performed.

If it is determined that there is a site where the virus may remain (ACT 34, NO), the processor 50 determines whether or not cleaning is performed from the acquired contact history information (ACT 38). If there is a history of cleaning performed (ACT 38, YES), the processor 50 displays guidance indicating that cleaning is already performed (ACT 39). The processor 50 also determines whether or not to display the likelihood of survival of the virus after cleaning (ACT 40).

For example, if the virus is removed by cleaning, the processor 50 determines that there is no virus immediately after the cleaning is performed. If it is determined that there is no virus, the processor 50 ends the processing of displaying information on the virus. If the cleaning reduces the likelihood of survival of the virus, the processor 50 corrects the likelihood of survival of the virus, which will be described later, depending on the cleaning status. If the likelihood of survival of the virus is corrected according to the cleaning status, the processor 50 proceeds to ACT 41.

If there is no history of cleaning performed (ACT 38, NO), the processor 50 identifies the elapsed time from the last contact of a user for each site (ACT 41). For example, the processor 50 identifies the elapsed time for each of the touch panel 42, the operation buttons 43, the ADF 14, and the paper feed cassettes 31 to 33.

If the elapsed time for each site is identified, the processor 50 identifies (acquires) the likelihood of survival of the virus (ACT 42). For example, the processor 50 calculates the likelihood of survival of the virus according to the elapsed time for each site based on the basic virus information indicating the relationship between the time result and the likelihood of survival of the virus.

Further, if the basic virus information for each humidity exists as the environmental information, the processor 50 selects the basic virus information according to the humidity detected by the temperature and humidity sensor 54. If the basic virus information is selected according to the humidity, the processor 50 calculates the likelihood of survival of the virus according to the elapsed time for each site based on the selected basic virus information.

Further, if the basic virus information for the material of each site exists, the processor 50 identifies the material for each site from the setting information stored in the memory 51 or the storage device 53. If the processor 50 identifies the material of each site, the processor 50 selects the basic virus information according to the identified material. If the basic virus information is selected according to the material identified from the setting information, the processor 50 calculates the likelihood of survival of the virus according to the elapsed time for each site based on the selected basic virus information.

If the external apparatus calculates the likelihood of survival of the virus, the processor 50 communicates with the external apparatus that calculates the likelihood of survival of the virus via the communication interface 55. The processor 50 provides the information necessary for calculating the likelihood of survival of the virus to the external apparatus, and acquires the calculation result of the likelihood of survival of the virus from the external apparatus. For example, the processor 50 provides information such as the elapsed time for each site, the material of each site, and environmental information (humidity) to the external apparatus. The external apparatus calculates the likelihood of survival of the virus with respect to the elapsed time for each site by using the basic virus information selected according to the material and environmental information of each site provided by the digital multifunction apparatus 1. As a result, the external apparatus notifies the digital multifunction apparatus 1 of the calculated information indicating the likelihood of survival of the virus for each site.

Further, if there is a history of cleaning performed, the processor 50 may correct the likelihood of survival of the virus calculated as described above according to the cleaning status. For example, the processor 50 corrects the likelihood of survival of the virus to a value with low according to the number of times or time of cleaning.

If the likelihood of survival of the virus is identified, the processor 50 identifies the number of contacts (touches) for each site (ACT 43). After identifying the number of contacts for each site, the processor 50 displays the virus infection suppression screen including the likelihood of survival of the virus on the display 41 (ACT 44). The virus infection suppression screen is, for example, the guidance screen as illustrated in FIG. 9. Further, the processor 50 may display the number of contacts for each site on the guidance screen as illustrated in FIG. 9.

The processor 50 displays the infection suppression screen for preset viruses. However, the processor 50 may display the infection suppression screen for a plurality of types of viruses. For example, the processor 50 may display the infection suppression screen as illustrated in FIG. 9 for each type of virus. Further, the processor 50 may display the infection suppression screen by giving priority to the virus having the highest risk of contact infection among the plurality of types of viruses.

As described above, the digital multifunction apparatus according to the embodiment displays information on the contact infection of the virus at the site contacted by a user (person) on the display. The digital multifunction apparatus stores contact history information indicating the contact history in a memory, and identifies the elapsed time from the contact of a person with each site from the contact history information. The digital multifunction apparatus calculates the likelihood of survival of the virus at each site based on the elapsed time from the contact of the person and the basic virus information. The digital multifunction apparatus displays information including the calculated likelihood of survival of the virus at each site on the display.

As a result, the digital multifunction apparatus can display a guidance screen on the display for suppressing contact infection of the virus. As a result, the user can visually recognize the list of contact infections and can use the digital multifunction apparatus by taking infection control measures according to the likelihood of survival of the virus.

The digital multifunction apparatus displays an infection suppression screen on the display if a user logs on to the image forming apparatus or the apparatus wakes up from the sleep mode. As a result, the digital multifunction apparatus can provide the user with information such as the likelihood of survival of the virus at the timing when the user starts operating the operation panel or the like.

Further, the digital multifunction apparatus 1 may display information such as likelihood of survival of a virus as a screen saver or a telop to be displayed if the digital multifunction apparatus 1 is not in use. As a result, the digital multifunction apparatus 1 can positively encourage a user to take measures against contact infection or cleaning even when the user is not actually operating the apparatus.

While certain embodiments have been described, these embodiments have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a printer that forms an image according to an operation of a person;
    a memory that stores contact history information indicating history of contact of the person;
    a processor that acquires information on contact infection of a virus at a site contacted by a specific person from the contact history information stored in the memory; and
    a display that displays the information comprising likelihood of survival of the virus at the site contacted by the person, and displays cleaning icon for instructing cleaning,
    wherein
    the processor that corrects the likelihood of survival of the virus if the cleaning is performed.

2. The image forming apparatus according to claim 1, wherein
    the processor corrects the likelihood of survival of the virus to a value with low according to the performed cleaning.

3. The image forming apparatus according to claim 1, wherein
    the processor that clears the contact history information for the cleaned site if the cleaning is performed.

4. The image forming apparatus according to claim 1, wherein
    the processor identifies elapsed time since the person last contacted the site from the contact history information, and calculates the likelihood of survival of the virus at the site from the identified elapsed time based on basic virus information indicating a relationship between elapsed time and the likelihood of survival of the virus.

5. The image forming apparatus according to claim 4, further comprising:
    a sensor that detects environmental information, wherein
    the processor calculates the likelihood of survival of the virus at the site from the elapsed time based on basic virus information according to the environmental information detected by the sensor.

6. The image forming apparatus according to claim 4, wherein
    the processor acquires setting information indicating a material of the site, and calculates the likelihood of survival of the virus at the site from the elapsed time based on basic virus information corresponding to the material of the site identified from the setting information.

7. The image forming apparatus according to claim 1, further comprising:
    a communication interface that communicates with an external apparatus, wherein
    the processor acquires the likelihood of survival of the virus at the site calculated by the external apparatus communicating with the communication interface.

8. The image forming apparatus according to claim 1, further comprising:
    a touch panel for a person to input an operation instruction, wherein
    the memory stores contact history information indicating history of contact of the person with the touch panel,
    the processor calculates the likelihood of survival of the virus on the touch panel based on the contact history information stored in the memory, and
    the display displays the likelihood of survival of the virus on the touch panel.

9. The image forming apparatus according to claim 1, further comprising:
    a paper feed cassette in which a person sets paper; and
    a cassette sensor that detects attachment or detachment of the paper feed cassette, wherein
    the memory stores contact history information indicating history of contact of the person with the paper feed cassette based on a detection result of the cassette sensor,
    the processor calculates the likelihood of survival of the virus on the paper feed cassette based on the contact history information stored in the memory, and
    the display displays the likelihood of survival of the virus on the paper feed cassette.

10. The image forming apparatus according to claim 1, further comprising:
    a scanner that reads an image of an original;
    an original cover that is configured to be opened and closed for covering the original to be scanned by the scanner; and
    an open and close sensor that detects an open and closed status of the original cover, wherein
    the memory stores contact history information indicating history of contact of a person with the original cover based on a detection result of the open and close sensor,
    the processor calculates the likelihood of survival of the virus on the original cover based on the contact history information stored in the memory, and
    the display displays the likelihood of survival of the virus on the original cover.

11. A method for an image forming apparatus, comprising:
    forming an image according to an operation of a person;
    storing contact history information indicating history of contact of the person;
    acquiring information on contact infection of a virus at a site contacted by a specific person from the contact history information stored; and
    displaying the information comprising likelihood of survival of the virus at the site contacted by the person, and cleaning icon for instructing cleaning, and
    correcting the likelihood of survival of the virus if the cleaning is performed.

12. The method according to claim 11, further comprising:
    correcting the likelihood of survival of the virus to a value with low according to the performed cleaning.

13. The method according to claim 11, further comprising:

clearing the contact history information for the cleaned site if the cleaning is performed.

14. The method according to claim 11, further comprising:

identifying elapsed time since the person last contacted the site from the contact history information, and calculating the likelihood of survival of the virus at the site from the identified elapsed time based on basic virus information indicating a relationship between elapsed time and the likelihood of survival of the virus.

15. The method according to claim 14, further comprising:

detecting environmental information; and calculating the likelihood of survival of the virus at the site from the elapsed time based on basic virus information according to the environmental information detected.

16. The method according to claim 14, further comprising:

acquiring setting information indicating a material of the site, and calculating the likelihood of survival of the virus at the site from the elapsed time based on basic virus information corresponding to the material of the site identified from the setting information.

17. The method according to claim 11, further comprising:

communicating with an external apparatus; and acquiring the likelihood of survival of the virus at the site calculated by the external apparatus communicating.

18. The method according to claim 11, further comprising:

inputting an operation instruction by a person on a touch panel;

storing contact history information indicating history of contact of the person with the touch panel;

calculating the likelihood of survival of the virus on the touch panel based on the contact history information stored; and displaying the likelihood of survival of the virus on the touch panel.

19. The method according to claim 11, further comprising:

setting paper in a paper feed cassette by a person;

detecting attachment or detachment of the paper feed cassette;

storing contact history information indicating history of contact of the person with the paper feed cassette based on a detection result;

calculating the likelihood of survival of the virus on the paper feed cassette based on the contact history information stored; and displaying the likelihood of survival of the virus on the paper feed cassette.

20. The method according to claim 11, further comprising:

opening and closing an original cover for covering an original to be scanned by a scanner;

an open and close sensor that detecting an open and closed status of the original cover;

storing contact history information indicating history of contact of a person with the original cover based on a detection result;

calculating the likelihood of survival of the virus on the original cover based on the contact history information stored; and displaying the likelihood of survival of the virus on the original cover.

* * * * *